(12) United States Patent
Choi et al.

(10) Patent No.: US 11,144,988 B1
(45) Date of Patent: Oct. 12, 2021

(54) ADAPTIVE PROBABILITY MATRIX

(71) Applicant: UIPCO, LLC, San Antonio, TX (US)

(72) Inventors: Sang Woo Choi, San Antonio, TX (US); Timothy Davison, San Antonio, TX (US); Garrett Rielly Rapport, San Antonio, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 217 days.

(21) Appl. No.: 16/203,306

(22) Filed: Nov. 28, 2018

Related U.S. Application Data (60) Provisional application No. 62/591,495, filed on Nov. 28, 2017.

(51) Int. Cl.
  *G06Q 40/02* (2012.01)
  *G06Q 20/10* (2012.01)
  *H04L 29/08* (2006.01)
  *G06F 17/18* (2006.01)

(52) U.S. Cl.
  CPC ............ *G06Q 40/02* (2013.01); *G06F 17/18* (2013.01); *G06Q 20/108* (2013.01); *H04L 67/26* (2013.01)

(58) Field of Classification Search
  None
  See application file for complete search history.

(56) References Cited

U.S. PATENT DOCUMENTS

| | | | |
|---|---|---|---|
| 8,538,827 B1* | 9/2013 | Dryer | G06Q 30/00 705/26.1 |
| 8,548,906 B1 | 10/2013 | Pellican | |
| 8,639,622 B1* | 1/2014 | Moore | G06Q 20/00 705/43 |
| 9,972,004 B1 | 5/2018 | Donavalli et al. | |
| 10,296,964 B1 | 5/2019 | Rausch et al. | |
| 10,825,000 B1 | 11/2020 | Sanzzi et al. | |
| 2009/0030840 A1 | 1/2009 | Kane | |
| 2011/0145109 A1* | 6/2011 | Watson | G06Q 40/06 705/27.2 |
| 2011/0208588 A1* | 8/2011 | Joa | G06Q 40/12 705/14.56 |
| 2015/0026055 A1* | 1/2015 | Calman | G06Q 20/3223 705/42 |
| 2015/0078586 A1 | 3/2015 | Ang et al. | |

(Continued)

FOREIGN PATENT DOCUMENTS

| | | |
|---|---|---|
| EP | 0992012 A1 | 4/2000 |
| EP | 1312012 A1 | 5/2003 |

OTHER PUBLICATIONS

Cadena, Ximena, and Antoinette Schoar. Remembering to pay? Reminders vs. financial incentives for loan payments. No. w17020. National Bureau of Economic Research, (Year: 2011).*

(Continued)

*Primary Examiner* — David P Sharvin
*Assistant Examiner* — Brock E Turk
(74) *Attorney, Agent, or Firm* — Perkins Coie LLP (57) ABSTRACT

The technology described includes an adaptive probability matrix that creates a notification schedule. The schedule can be used to send reminders to users to press a physical, connected device/button, that when pressed or clicked, causes money to be transferred according to a set of rules (i.e., a "one-click" transfer of funds).

20 Claims, 9 Drawing Sheets

(56) References Cited

U.S. PATENT DOCUMENTS

2016/0125408 A1* 5/2016 Crawford ............. G06Q 20/405
  705/34
2017/0186096 A1* 6/2017 Eramian ................ G06Q 40/12
2017/0193501 A1* 7/2017 Cole .................... G06Q 20/357

OTHER PUBLICATIONS

Gusev, Marjan K., E-Deposit in Academic Use, Jan. 1, 2002, ITI 2002, Proceedings of the 24th International Conference on Information Technology Interfaces (IEEE Cat. No. 02EX534) ,pp. 343-348 vol. 1,Year: 2002.
Woodfruff, L.F., A System of Electric Remote-Control Accounting, Feb. 1, 1938, Electrical Engineering, vol. 57, Issue: 2, pp. 78-87, Year: 1938.
PNC's Virtual Wallet Takes Online Banking to the Next Level, https://pnc.mediaroom.com/index.php?s=3473&item=74221, Aug. 5, 2008, Year: 2008.

\* cited by examiner

ADAPTIVE PROBABILITY MATRIX

CROSS-REFERENCE TO RELATED APPLICATIONS

This application is a non-provisional of and claims priority to U.S. Provisional Application No. 62/591,495 filed Nov. 28, 2017, entitled "ADAPTIVE PROBABILITY MATRIX," which is hereby incorporated by reference in its entirety for all purposes.

TECHNICAL FIELD

Various embodiments of the present disclosure generally relate to an adaptive probability matrix. More specifically, various embodiments of the present disclosure relate to methods and systems that use an adaptive probability matrix to create a notification schedule for, in an example, a saver button.

BRIEF DESCRIPTION OF THE DRAWINGS

Embodiments of the present disclosure will be described and explained through the use of the accompanying drawings in which.

DETAILED DESCRIPTION

Various embodiments of the present disclosure generally relate to an adaptive probability matrix that can be used to create a notification schedule. In some embodiments, the notification schedule can be used to send reminders to users to press a physical, connected device/button, that when pressed or clicked, causes money to be transferred according to a set of rules.

U.S. patent application Ser. No. 15/496,843, entitled "Saver Button," which is incorporated by reference in its entirety for all purposes, discloses a saver button that enables users to save more frequently and more easily by simply clicking a button. In some embodiments, the saver button is a small, transportable device that can be taken and used anywhere. The saver button is a physical, connected (e.g., Bluetooth, Wi-Fi) device having at least one button that, when pressed or clicked, causes money to be transferred according to a set of rules (i.e., a "one-click" transfer of funds). For example, in some embodiments, each click can cause a small, pre-set increment of money to be transferred from a user's checking account to the user's savings account. In some embodiments, the user can hold the button down for a longer period of time, indicating a request for a larger amount of money to be transferred.

A user can register the saver button to associate the saver button with one or more accounts. Registration can include providing the serial number of the saver button, account numbers, user preferences (e.g., amount to transfer with each button push, accounts to transfer from/to, restrictions), mobile or other device information, and/or network information. Receiving such information can activate the saver button for saving when a click is received.

The saver button can communicate with a saver button and notification platform using one or more communication networks and techniques. In some embodiments, the saver button communicates with the saver button and notification platform through a proxy such as a smart device (e.g., mobile device). In such cases, the saver button can be paired with the mobile device, and, when the saver button is pushed, the saver button sends a message to the mobile device, which in turn sends a message to the saver button and notification platform. In other embodiments, the saver button uses Wi-Fi or other communication network(s) to communicate directly with the saver button and notification platform without using a proxy.

In some embodiments, the saver button can be used with more than one account. The account to transfer money to/from can depend on the operator of the saver button. The identity of the operator may be determined by detecting the proximity or identity of nearby devices (e.g., geolocation, Bluetooth), by receiving authentication information (e.g., fingerprint, voice print), and/or an identity of the proxy device. Although the saver button is primarily described as being a device for transferring money, the saver button can be used for other purposes.

In some circumstances, users diligently use the saver button during an initial period but eventually slow down or stop using it. Thus, to increase engagement with the saver button (and hence increase savings), notifications reminding the user to press the button and/or encouraging the user to save can be sent to the user at strategic times. To generate a notification schedule that is targeted and effective for the particular user, the system uses an adaptive probability matrix, the amount of money transferred with each button press, and the user's savings goals. The adaptive probability matrix can be used to determine the time or times during the day and particular days that the user is most likely to press the saver button such that the notification can be sent to remind the user to press the button.

The system can gather data regarding historical button pushes such as the time of day the button was pushed, the day of the week, the location at which the button was pushed (using, e.g., location of the user's smart device, networks to which the smart device was connected), and other devices or networks nearby when the device was pushed. The system can determine for each increment of time (e.g., hour by hour, day by day) over a period of time (e.g., day, week, month), the probability that the user will push the saver button based on the historical information. Each increment of time can be assigned a probability value indicating the likelihood of the user will press the saver button. For example, the historical button data may show that the user is more likely to depress the button when the user is at home in the evenings. Thus, evening times can be assigned higher probabilities.

The system can determine the number of button pushes required per period of time (e.g., week) based on an amount of funds saved with each button push and the user's savings goal within that time period (e.g., weekly savings goal). The system can then generate the notification schedule of the times and days for reminders to be sent to the user based on the probabilities and the number of times the button needs to be pushed during the time period. For example, the notification schedule can schedule reminders when the probability is greater than a predefined threshold according to the number of times the user is expected to press the button to meet his or her goal. In some embodiments, fewer or more reminders may be scheduled, depending, for example, on user preferences.

In some embodiments, prior to the notification being sent, the system can check various features to determine whether the user does not need a reminder (e.g., the has already pressed the button). For example, the system can check the user's account balance or how many button pushes the user has performed within the time period. In some embodiments, the user can be sent an encouraging message with the user's progress before or after the button has been pushed.

In some embodiments, the system can check whether the user is in a location that the user will likely press the button (e.g., the user may typically press the button when the user is connected to a home network) or will not press the button (e.g., at work). The notification schedule can be altered accordingly. For example, if the user is not connected to a home network and the system is scheduled to send a notification to the user, the system can adapt the schedule to another time that is within a time period. In some embodiments, the system can locate the next available time with a probability that is above a threshold.

Although the disclosure discusses the adaptive probability matrix with regard to the saver button, the adaptive probability matrix can be used to generate notification schedules for other purposes such as collecting signatures on documents, collecting payments that are coming due or are overdue, or anything else that requires immediate or near-term user action. In some embodiments, the functionality of the saver button can be implemented on a smart device (e.g., mobile phone) that can be used for other purposes.

As used herein, the term "user" is used synonymously with any person or individual. In the following description, for the purposes of explanation, numerous specific details are set forth in order to provide a thorough understanding of embodiments of the present disclosure. However, it will be apparent on reading the disclosure to one skilled in the art that embodiments may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical discs, compact disc read-only memories (CD-ROMs), magneto-optical disks, ROMs, random-access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 1:
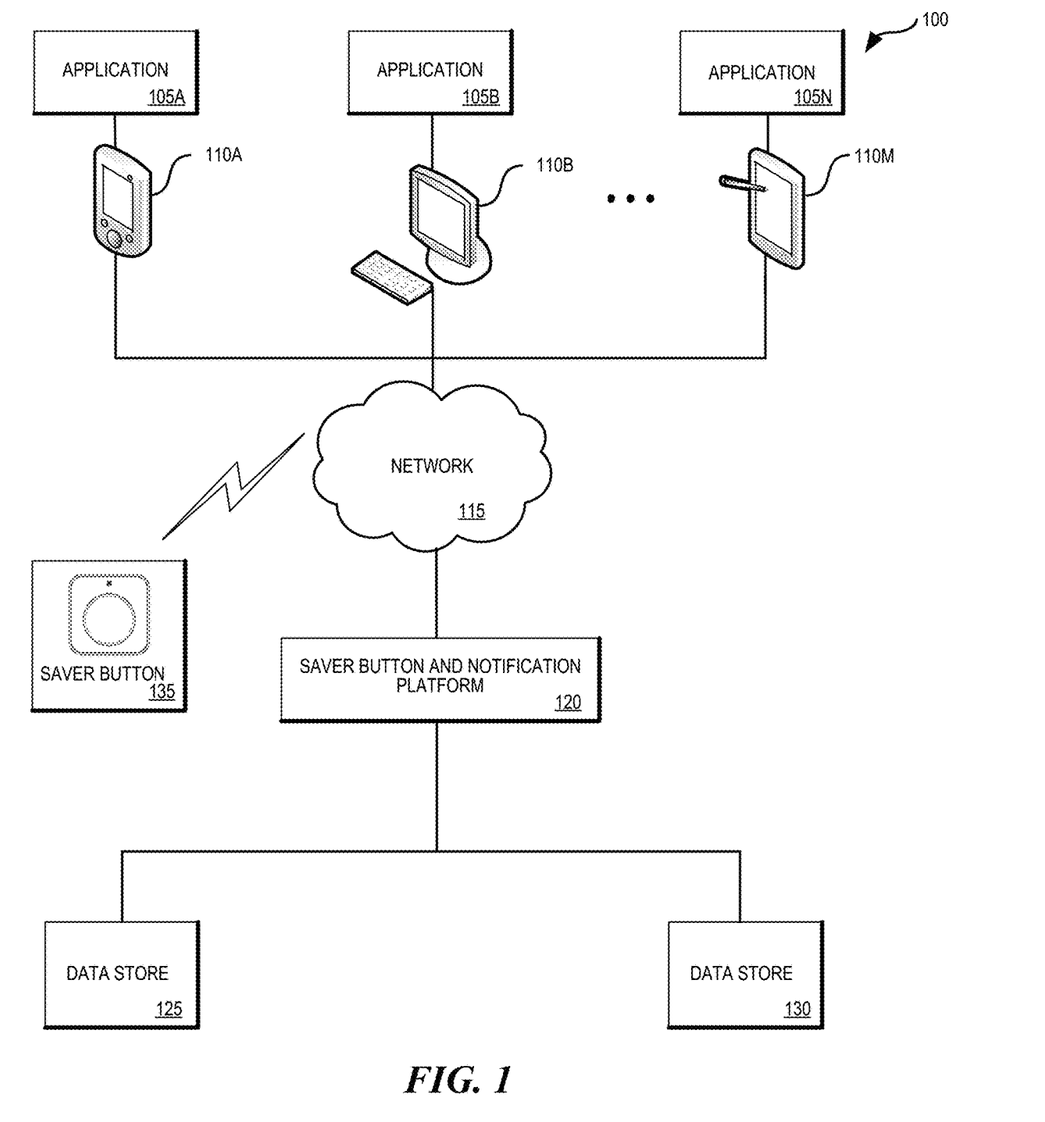
FIG. 1 illustrates an example of a network-based operating environment in accordance with various embodiments of the present disclosure.

FIG. 1 illustrates an example of a network-based operating environment 100 in which some embodiments of the present disclosure may be used. As illustrated in FIG. 1, operating environment 100 may include applications 105A-105N running on one or more computing devices 110A-110M (e.g., a mobile device; a mobile phone; a telephone; a tablet computer; a mobile media device; a mobile gaming device; a vehicle-based computer; a dedicated terminal; a public terminal, a desktop, or a laptop computer; a kiosk; wearable devices such as a smartwatch). In some embodiments, applications 105A-105N may be stored on one or more computing devices 110A-110M or may be stored remotely on a server (in the "cloud"). These computing devices can include mechanisms for receiving and sending traffic by connecting through network 115 to saver button and notification platform 120, saver button 135, and data stores 125 and 130.

FIG. 1 also shows saver button 135 connected via network 115 to saver button and notification platform 120. As described above, saver button 135 is a physical, connected (e.g., Bluetooth, Wi-Fi) device having at least one button that, when clicked or depressed, causes money to be transferred according to a set of rules. In response to receiving a "click" of its button, saver button 135 can send a request to transfer funds directly to saver button and notification platform 120 via network 115. In other embodiments, saver button 135 can send a request to transfer funds to computing devices 110A-110M running applications 105A-105N, and the computing devices 110A-110M in turn communicate the request to saver button and notification platform 120.

In some embodiments, saver button 135 can include a light that indicates a savings level of the user over a period of time (e.g., an area of the saver button exhibits a certain color or pattern of light if the user has met a savings goal for a week/day/month). In other embodiments, the light can indicate an identity of the operator and/or where the money will be transferred (e.g., when money will be transferred into a primary user's account, the light is blue; when money will be transferred to the user's son's account, the light is yellow). In some embodiments, the light can indicate an amount that will be transferred (e.g., yellow light means $5, purple light means $10). In other embodiments, the color can indicate restrictions (e.g., a blinking red light indicates that there is not enough money in the user's account to perform the transfer). The button may include other indicators (e.g., chirping, vibration) to convey a message.

In some embodiments, the user can hold down the button to indicate an amount of funds to transfer (e.g., holding down the button for more than one second increases the amount transferred). Saver button 135 may provide messages to the user. In some embodiments, saver button 135 may provide reminders such as "You have reached 50% of your savings goal for the week" or a confirmation such as "You just transferred $5 to your savings account." The messages and indications of the saver button can be specified by the user when the user registers the device.

Computing devices 110A-110M may be configured to communicate via the network 115 with saver button and notification platform 120. In some embodiments, computing devices 110A-110M can retrieve or submit information to saver button and notification platform 120 and run one or more applications 105A-105N with customized content retrieved by saver button and notification platform 120 and data stores 125 and 130. For example, computing devices 110A-110M can execute a browser application or a customized client to enable interaction between the computing devices 110A-110M, saver button 135, saver button and notification platform 120, and data stores 125 and 130. In some embodiments, saver button and notification platform 120 can be a server. In an example, computing devices 110A-110M may be used to register saver button 135 and, in some implementations, receive an indication of a button push from saver button 135. Thereafter, computer devices 110A-110M may submit the request to saver button and notification platform 120 to complete the funds transfer. In some embodiments, computing devices 110A-110M may receive notifications from saver button and notification platform 120 reminding the user to press the button and/or a follow-up communication from saver button and notification platform 120 stating that the funds transfer is complete, which in turn can be communicated to saver button 135 to notify the user (e.g., flashing lights, buzzing, chirping, voice memo). In some embodiments, saver button 135 receives the message directly from saver button and notification platform 120.

Network 115 can be any combination of local area and/or wide area networks, using wired and/or wireless communication systems. Network 115 can be or could use any one or more protocols/technologies: Ethernet, IEEE 802.11 or Wi-Fi, worldwide interoperability for microwave access (WiMAX), cellular telecommunication (e.g., 3G, 4G, 5G), CDMA, cable, digital subscriber line (DSL), etc. Similarly, the networking protocols used on network 115 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over network 115 may be represented using technologies, languages, and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec).

Data stores 125 and 130 can be used to manage storage and access to user data such as user profiles, reminder preferences, savings goals, account information, authentication information, transfer rules (e.g., pre-set transfer amounts, transfer restrictions), and employment history. Data stores 125 and 130 may be a data repository of a set of integrated objects that are modeled using classes defined in database schemas. Data stores 125 and 130 may further include flat files that can store data. Saver button and notification platform 120 and/or other servers may collect and/or access data from the data stores 125 and 130. Information provided by users can be stored in data stores 125 and 130.

Figure 2:
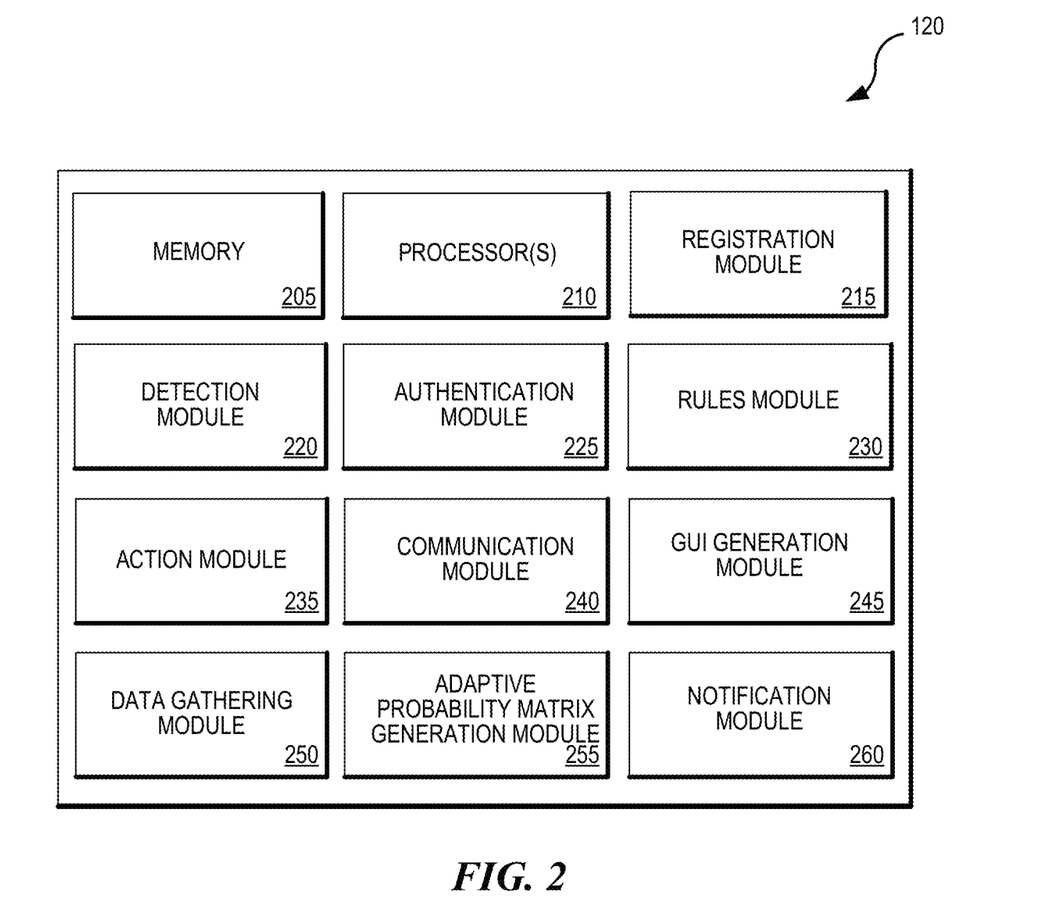
FIG. 2 illustrates various components of a saver button and notification platform that may be used in accordance with various embodiments of the present disclosure.

FIG. 2 illustrates a set of components within saver button and notification platform 120 according to one or more embodiments of the present disclosure. In some embodiments, some or all of these components can be included inside computing devices 110A-110M and/or saver button 135. For example, if computing devices 110A-110M are being used as a proxy to transfer information, then some information can be processed by computing devices 110A-110M (e.g., identification, authentication).

According to the embodiments shown in FIG. 2, saver button and notification platform 120 can include memory 205, one or more processors 210, registration module 215, detection module 220, authentication module 225, rules module 230, action module 235, communication module 240, graphical user interface (GUI) generation module 245, data gathering module 250, adaptive probability matrix generation module 255, and notification module 260. Other embodiments of the present invention may include some, all, or none of these modules and components along with other modules, applications, and/or components. Still yet, some embodiments may incorporate two or more of these modules and components into a single module and/or associate a portion of the functionality of one or more of these modules with a different module.

Memory 205 can store instructions for running one or more applications or modules on processor(s) 210. For example, memory 205 could be used in one or more embodiments to house all or some of the instructions needed to execute the functionality of registration module 215, detection module 220, authentication module 225, rules module 230, action module 235, communication module 240, GUI generation module 245, data gathering module 250, adaptive probability matrix generation module 255, and notification module 260. Generally, memory 205 can include any device, mechanism, or populated data structure used for storing information. In accordance with some embodiments of the present disclosure, memory 205 can encompass, but is not limited to, any type of volatile memory, non-volatile memory, and dynamic memory. For example, memory 205 can be random-access memory, memory storage devices, optical memory devices, magnetic media, floppy disks, magnetic tapes, hard drives, SIMMs, SDRAM, DIMMs, RDRAM, DDR RAM, SODIMMS, EPROMs, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205.

Registration module 215 can receive a request to register a saver button for a user. When registering a saver button, the user can provide an identifier of the saver button (e.g., saver button serial number) and set up a password for the saver button. The user may be required to pair the saver button to the user's mobile device (e.g., using Bluetooth). Once the pairing is complete, the saver button may provide a visual (or other sensory) indication. The user can give a name to the saver button. In some embodiments, the user provides additional or other network or device information (e.g., a wireless network) so that saving requests can be transferred and executed. The saver button may be paired with more than one user device. In some embodiments, the saver button is registered with certain restrictions such as requiring the saver button to be on the same network as, paired with, or within a certain distance of a certain device before savings or transfers can take place (e.g., to prevent a child from pressing the button when his/her parent is not home).

After providing the device and/or network information, the user may provide one or more accounts to transfer funds from, one or more accounts to transfer funds to, and an amount to transfer per button push. The user can further specify user preferences such as if/when to receive reminders and/or notifications, and how notifications should look/sound/feel (e.g., different colors, sounds, vibrations). The user may be asked to set up rules or restrictions, such as when to deny requests to transfer (e.g., when an account balance is below a certain level, when the button is pushed more than a certain number of times within a certain period of time, after a certain time of day), which account funds should be transferred to/from (e.g., if the user's child is pressing the button, $5 should be transferred from the user's account to the child's savings account; if the user is pressing the button, $10 should be transferred from the user's checking account to the user's savings account).

In some embodiments, the user can update the rules after the registration process is complete. For example, if a child has completed a task, the user can update the rules to state that the next button push should transfer $5 to her child's account.

Detection module 220 can receive a communication from communication module 230 that detects that a button push has occurred. The communication can be a message that includes information regarding the identity of the saver button (e.g., serial number), the device sending the message (e.g., saver button, proxy such as a mobile computing device), how long the button was pushed for, and who pushed the button. The information regarding who pushed the button may be collected by the saver button by detecting which device was closest in proximity to the saver button during the push (e.g., identified by Bluetooth ID). In other embodiments, the saver button recognizes or records other identifying information (e.g., the user speaks the user's name, collects a fingerprint on the saver button), and such information is provided in the message to detection module 220.

Authentication module 225 can receive authentication information collected by the saver button, such as a fingerprint, a voice print, or a token. Such information can be verified prior to a transfer being performed. In some embodiments, no additional authentication information is needed when the transfer request is received via a network associated with the saver button (e.g., home network, work network).

Rules module 230 can process the request to determine which account should be debited, which account should be credited, whether there are any restrictions, and/or what notifications need to be sent, or it can apply other rules associated with the saver button. Results from the rules module 230 can be sent to action module 235. In some embodiments, before a transfer will take place, the transferring account is required to have a minimum amount of funds. In some embodiments, a maximum amount of funds can be transferred within a given period of time.

Action module 235 can perform the action determined by rules module 230. For example, when rules module 230 determines that a $5 transfer from the user's checking account should be transferred to the user's savings account, action module 235 transfers the funds. Action module 235 can send information confirming that an action took place to communication module 240.

Communication module 240 can facilitate communication with computing devices and/or the savings button directly. For example, communication module 240 can receive, from a network, communications regarding button pushes directly transmitted by the saver button or via a proxy. Communication module 240 can relay information regarding button pushes to detection module 220. Communication module 240 can send messages to the saver button or other devices. For example, communication module 240 can receive information from action module 235 that a transfer is complete or denied and can send this information to the saver button. The saver button can provide a notification to the user indicating whether the transfer occurred (e.g., blinking green light) or was denied (e.g., blinking red light).

GUI generation module 245 can generate one or more GUI screens that allow for interaction with a user. In at least one embodiment, GUI generation module 245 generates a GUI for receiving and/or conveying information (e.g., information relating to registering the saver button) to the user's computing device.

Data gathering module 250 can gather data regarding historical button pushes such as the time of day the button was pushed, the day of the week the button was pushed, the location at which the button was pushed (using, e.g., location of the user's smart device, network), and/or other devices nearby when the device was pushed. Data gathering module 250 can also gather information regarding user preferences from registration module 215 such as the user's weekly or monthly savings goals and the amount of funds that should be transferred from the first account to the second account with each button push. Data gathering module 250 can send such information to adaptive probability matrix generation module 255.

Adaptive probability matrix generation module 255 creates an adaptive probability matrix that is used to determine a notification schedule that defines when notifications should be sent to the user's smartphone (or other device) based on times (e.g., time of day and/or day of week) the user is most likely to press the button and how many button presses are required to meet the user's savings goals over a period of time. Thus, the notification schedule includes the times and days with the highest likelihood of resulting in a saver button push, and thus enhanced saving.

First, adaptive probability matrix generation module 255 determines, for each increment of time (e.g., an hour by hour, day by day) over a period of time (e.g., each day of a week, week, month), the probability that the user will push the saver button at each increment of time. To determine the probability, adaptive probability matrix generation module 255 analyzes one or more of the following: pay days, historical saver button push information and/or demographic information relating to historical saver button pushes. Historical saver button push information can include the following information relating to the historical saver button pushes: time of day, day of week, network connectivity of smart device of user including nearby networks and devices, and location where saver button was pushed (e.g., by GPS, cell phone triangulation, network information). Regarding demographic information, users can be grouped by generation, employment, location, and/or account balance.

Each increment of time can be assigned a probability value indicating the likelihood of the user will press the saver button based on the historical button push information, demographic information, and/or, in some embodiments, real-time information (e.g., the user's current location). In an example, assuming the increment of time is hours, if the historical button push information indicates that the user has in the past or typically presses the button between 6:00 a.m. and 7:00 a.m. and 8:00 p.m. and 9:00 p.m. on week days when the user is connected to a home network, adaptive probability matrix generation module 255 will place the highest probabilities (e.g., 85%) on the 6:00 a.m. hour and the 7:00 p.m. hour on Monday through Friday. The next highest probabilities (i.e., slightly lower) can be placed on the hours closest to these hours. For example: 5:00 a.m., 8:00 a.m., 7:00 p.m., and 9:00 p.m. can have a 70% probability, whereas 4:00 a.m. and 9:00 a.m. can have a 20% probability, and so on. The decrease in probability from 6:00 a.m. and 7:00 a.m. to 9:00 a.m. can be due to the user going to work and not taking the saver button and the decrease in probability from 5:00 a.m. to 4:00 a.m. can be due to the user sleeping and not likely to press the button. Thus, for example, adaptive probabilities matrix generation module 255 can place the lowest probabilities during the time the user is likely sleeping and during the day on week days when the user is presumably at work.

Next, adaptive probability matrix generation module 255 determines the number of button pushes required per period of time (e.g., week) to meet the user's savings goals within the time period based on an amount of funds saved with each button push. That is, if the user has a goal of saving $30 per week and each button press transfers $5, then 6 button pushes are needed to meet the user's savings goal. Then, adaptive probability matrix generation module 255 creates a notification schedule of the times and days for a reminder to be sent to the user based on the probabilities and the number of times the button needs to be pushed (e.g., six times). In some embodiments, fewer or more notifications are scheduled to be sent than button pushes needed to meet the user's savings goal. For example, although six button pushes in one week are needed, only four notifications may be scheduled. In cases where the probability is the same (e.g., 6:00 p.m. on Monday has the same probability as 7:00 p.m. on Monday or 6:00 p.m. on Tuesday) and only one notification needs to be sent, a time/day is scheduled at one of the three times chosen randomly. In some embodiments, the probabilities can be compared to a threshold. That is, if none of the probabilities are above the threshold probability level, then no notifications are sent. The threshold can be randomly generated or determined by business rules. Thus, in some embodiments, if the probability that a reminder being sent to the user will result in any button pushes is too low, no reminders will be sent to the user.

In some embodiments, adaptive probability matrix generation module 255 can check some parameters prior to notifying the user. For example, adaptive probability matrix generation module 255 can check the user's checking account, savings account, or button push status. For example, if the user does not have the requisite funds in the checking account for a transfer or if the user pushed the button and is tracking for savings ahead of schedule, then the notification schedule can be adapted and one or more notifications can be skipped. Or, if the user pressed the saver button within a certain time period of sending the notification, the notification may not need to be sent. In some embodiments, prior to sending the notification, the user's smart device can be checked to see whether the user is connected to the saver button and/or at an expected location. For example, if the adaptive probability matrix generation module 255 determines that a notification time with a high probability of resulting in a button push is Tuesday evening when the user is at home, that probability may be decreased significantly if the user is away from home on Tuesday evening prior to the notification being sent. In a further example, adaptive probability matrix generation module 255 can use known information about the user such as that the user only presses the button when the user's button is connected (e.g., via Bluetooth) to the user's smart device. Thus, adaptive probability matrix generation module 255 can check the connectivity of the user's smart device prior to sending a notification and alter the schedule if the user's smart device is not connected to the user's saver button.

As time moves forward, data gathering module 250 continues to collect the data and adaptive probability matrix generation module 255 uses such data to continually update the adaptive probability matrix. Thus, periodically (e.g., hourly, weekly, monthly, quarterly), notification schedules can change.

Notification module 260 can initiate notifications to the user following the schedule set forth by adaptive probability matrix generation module 255. The notification can be a text message, phone call, email, push notification sent to the user's smart device, phone, tablet, or other device. In other embodiments, the notification can be a message sent to the saver button itself. The saver button could light up, vibrate or otherwise alert the user to push the button. In some embodiments, the notification can display or provide a link to a display of a chart showing actual savings, percent of goal, and/or projected savings. Additional information in the display can include a breakdown of savings (e.g., by week, day, month) as well as current and best savings streaks. The displays can keep the user engaged and committed to saving.

Figure 3:
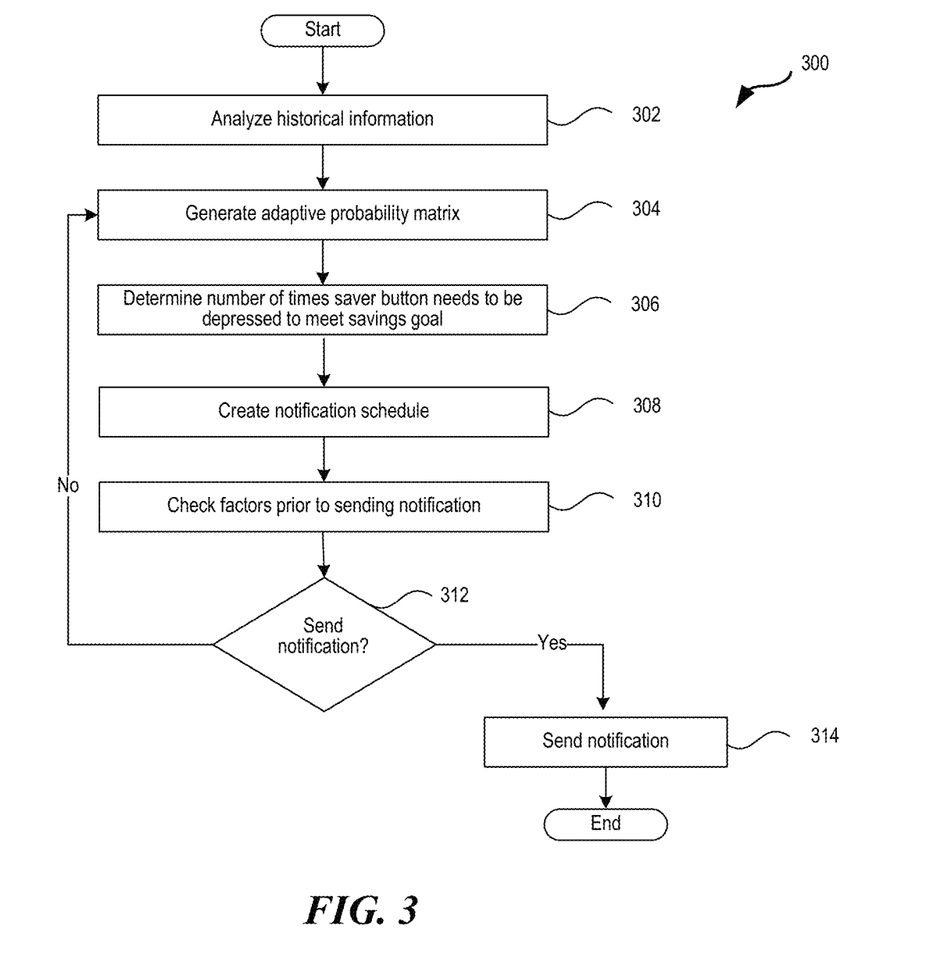
FIG. 3 is a flowchart illustrating a set of operations for creating a notification schedule using an adaptive probability matrix in accordance with various embodiments of the present disclosure.

FIG. 3 is a flowchart illustrating a set of operations 300 for registering and processing requests from a saver button. In some embodiments, fewer than all of the operations in each set of operations are performed, whereas in other embodiments additional operations are performed. Moreover, in some embodiments, the operations may be performed in different orders or in parallel. The operations can be performed by various components of the saver button and notification platform 120 illustrated in FIG. 2.

Analyzing operation 302 analyzes historical information related to a user pressing a saver button. The historical information can include days, time, and locations when/where the button was pressed. Generating operation 304 generates an adaptive probability matrix that includes probabilities at each increment of time over a period of time that the user will depress the saver button. The adaptive probability matrix can be based at least in part on the historical information. Determining operation 306 can determine the number of times the saver button needs to be depressed to meet savings goal within the period of time. Creating operation 308 creates the notification schedule for notifications to be sent based on the probabilities at each increment of time and the number of times within the period of time the saver button needs to be depressed to achieve the savings goals. Checking operation 310 checks various factors prior to sending a notification to ensure that the user needs the notification or that circumstances don't change the probabilities by more than a threshold. Decision operation 312 determines whether to send a notification. For example, if the user has already met his or her savings goals for the week, a notification need not be sent. Or, if the user is not located at home where the user typically presses the saver button, a notification may be delayed until the user is more likely to press the saver button. If a notification should not be sent, decision operation 312 branches to generating operation 304 so that a new notification schedule can be created. Alternatively, if a notification should be sent, decision operation 312 branches to sending operation 314 where a notification is sent.

Figure 4:
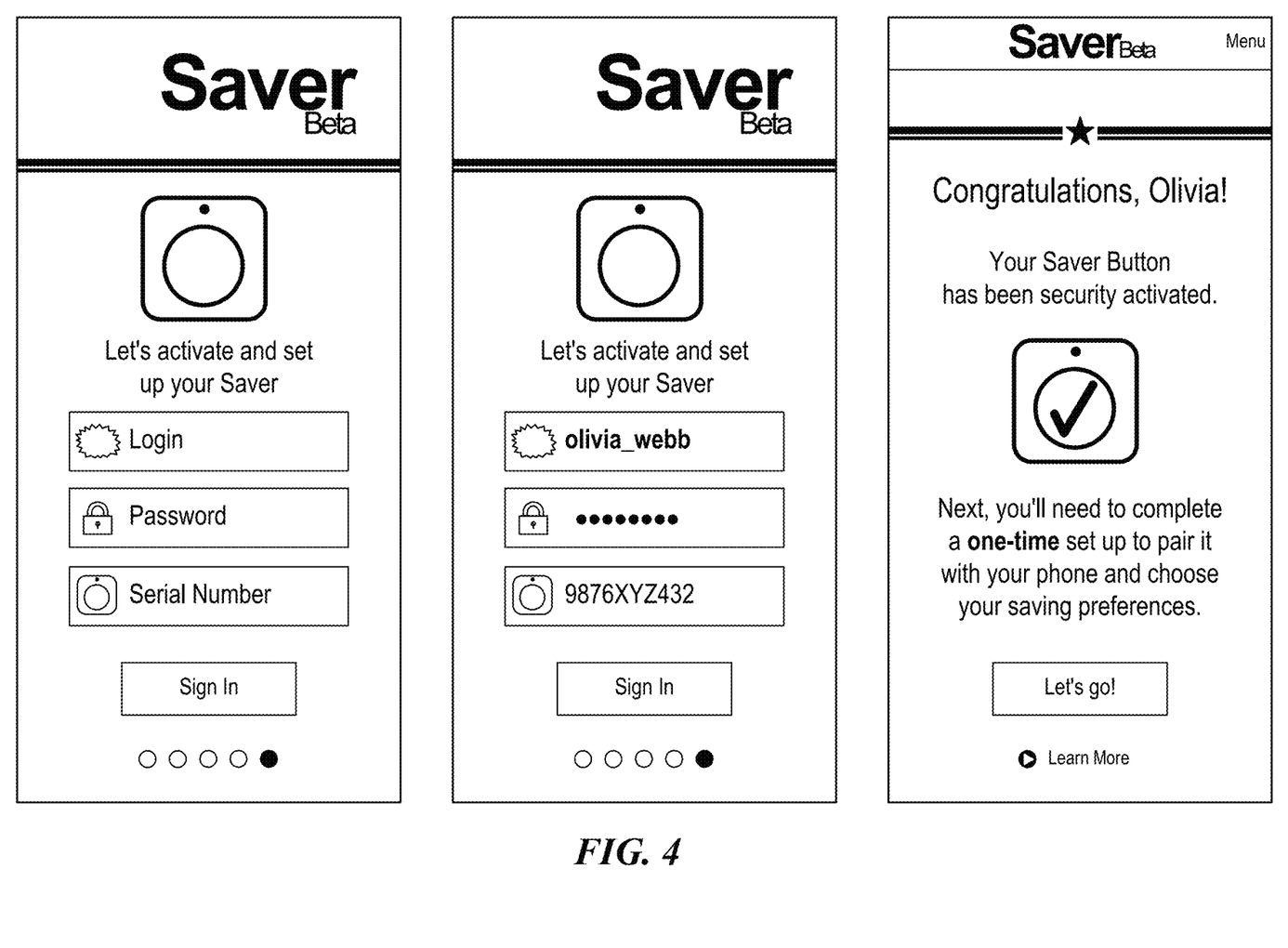
FIGS. 4-8 depict user interfaces for registering a saver button in accordance with various embodiments of the present disclosure.
Figure 5:
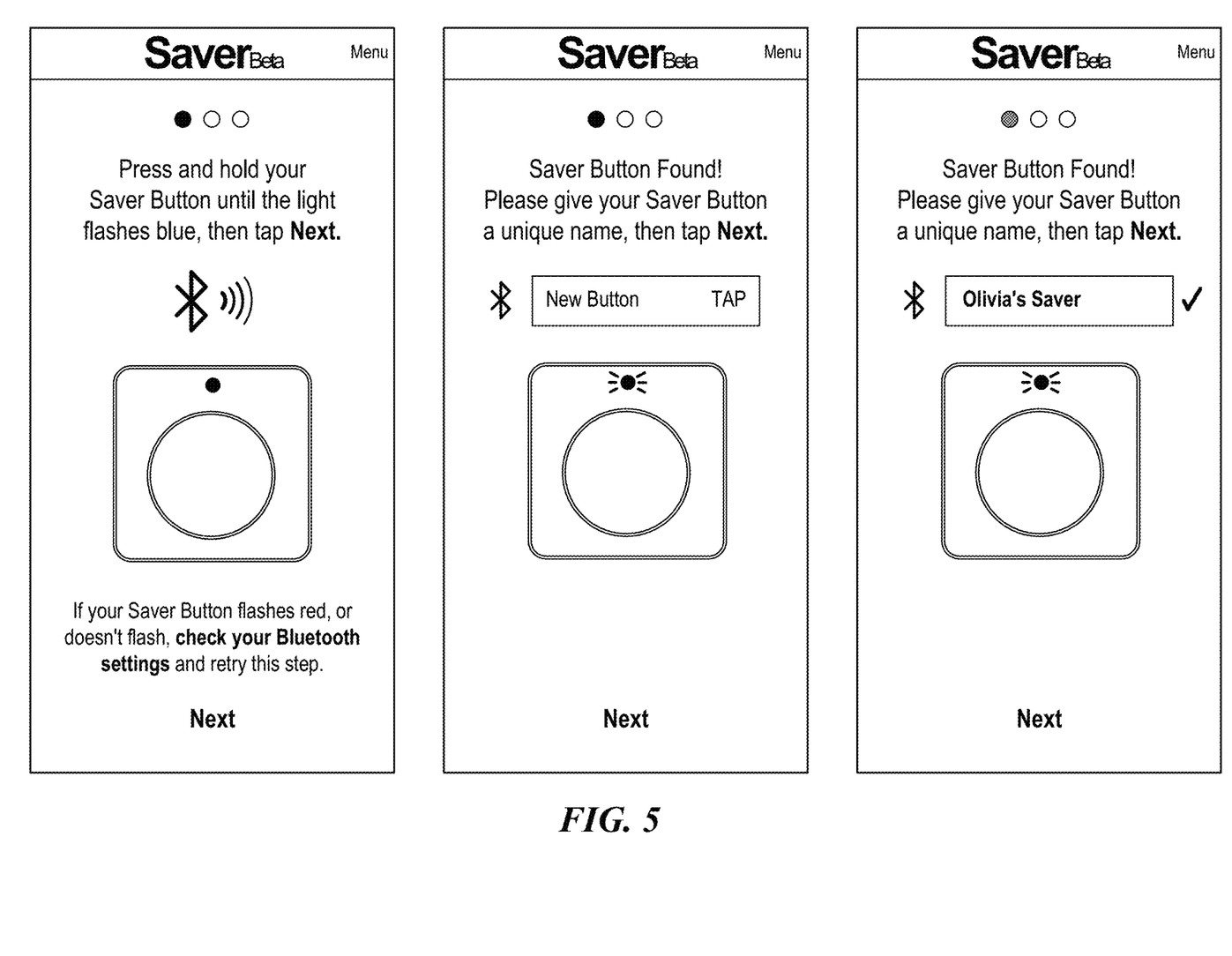
Figure 6:
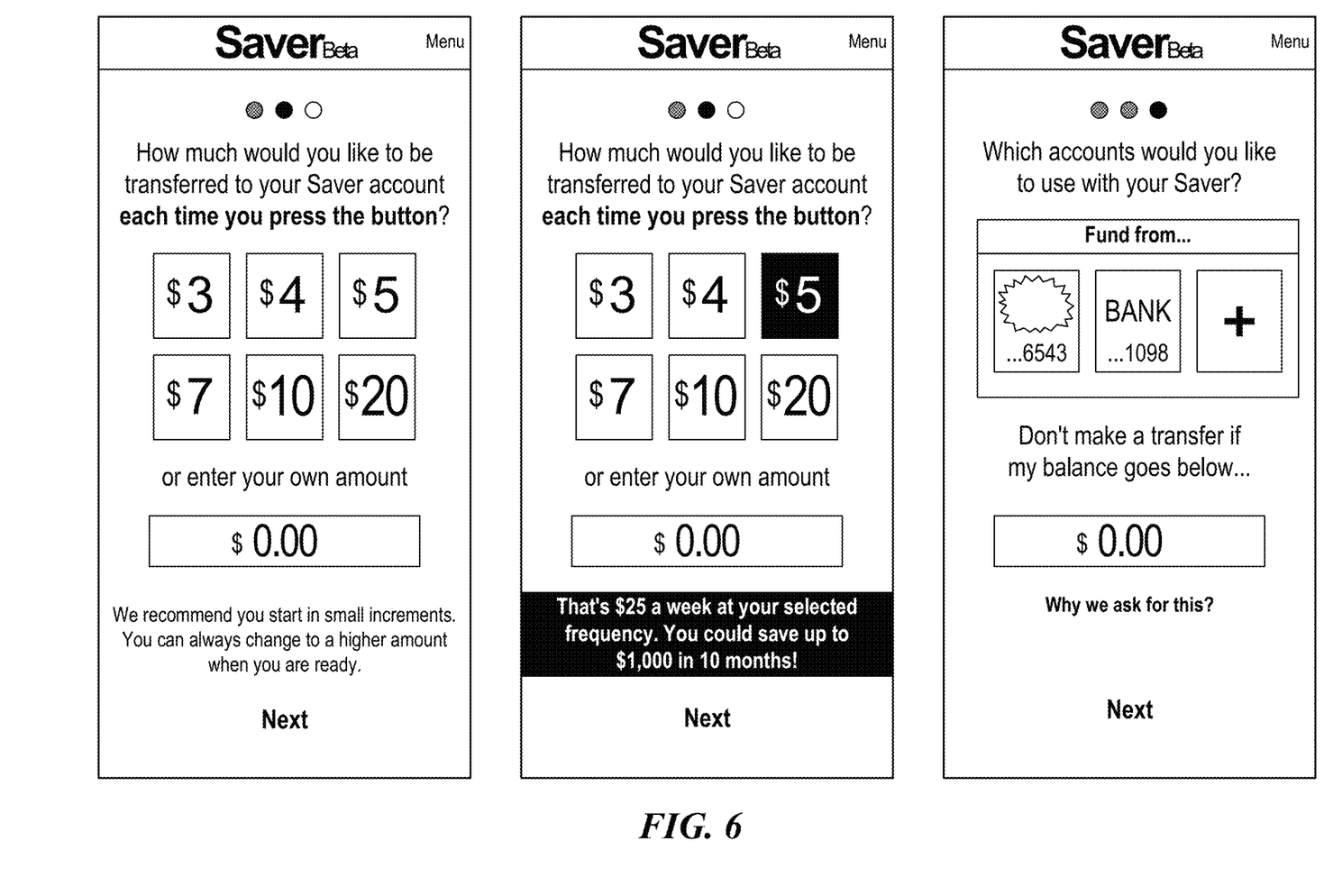
Figure 7:
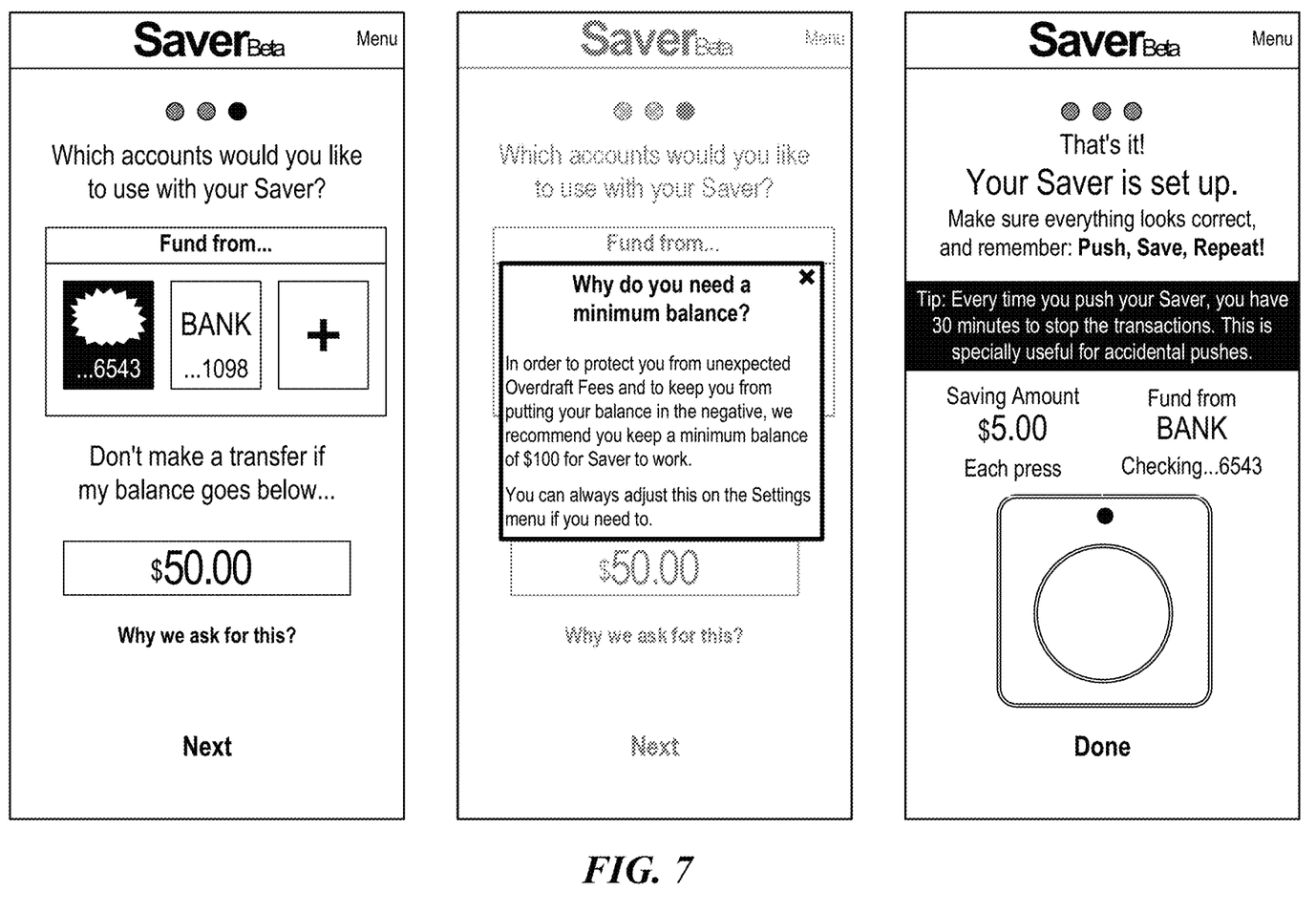
Figure 8:
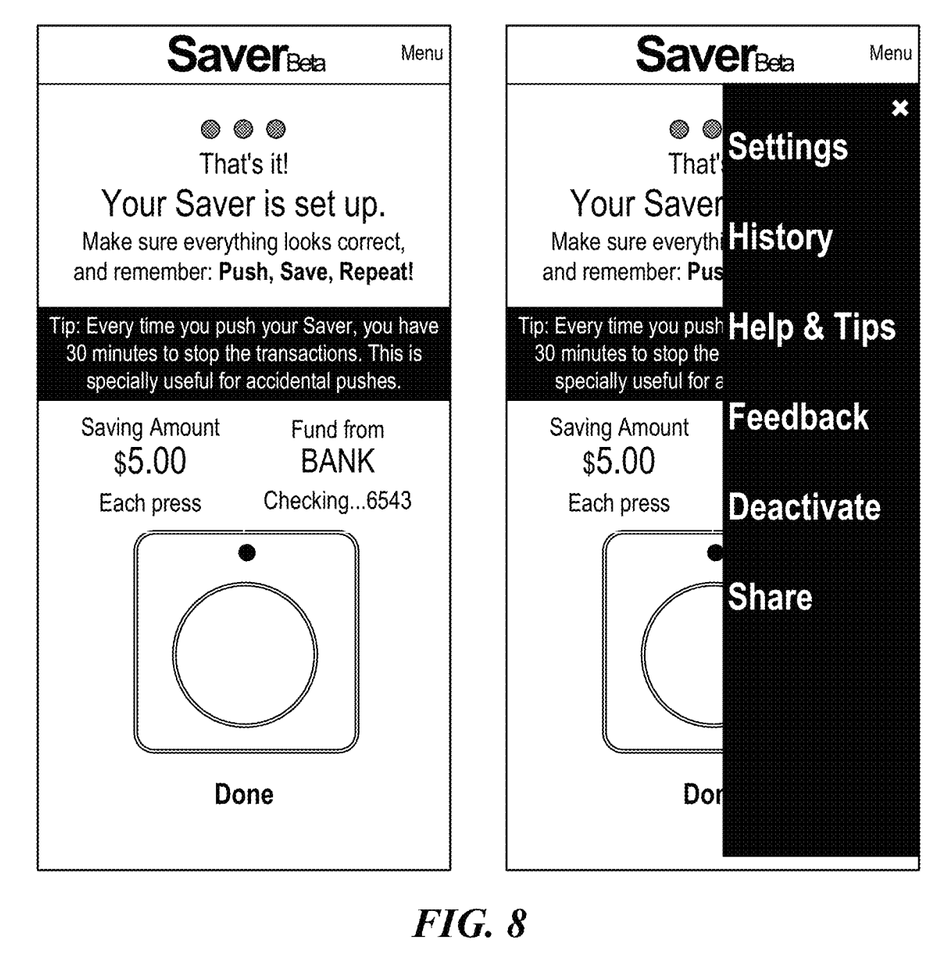

FIGS. 4-8 depict user interfaces for registering a saver button. More specifically, FIG. 4 depicts examples of user interfaces for activating a saver button. The user can provide credentials as well as a serial number of a saver button in an application. FIG. 5 depicts examples of user interfaces for pairing the saver button with a mobile device. FIG. 6 depicts examples of user interfaces allowing a user to select an amount of funds to be transferred when the saver button is pressed and which accounts should be used with the saver button. FIG. 7 depicts examples of user interfaces in which the user specifies a minimum amount of funds that must be available in the funding account before funds will be transferred. FIG. 8 depicts an example of a user interface summarizing the amount of money to be transferred from which account when the saver button is pushed and a menu relating to the saver button (e.g., history of transfers, settings, help, deactivate, share, feedback).

Computer System Overview

Figure 9:
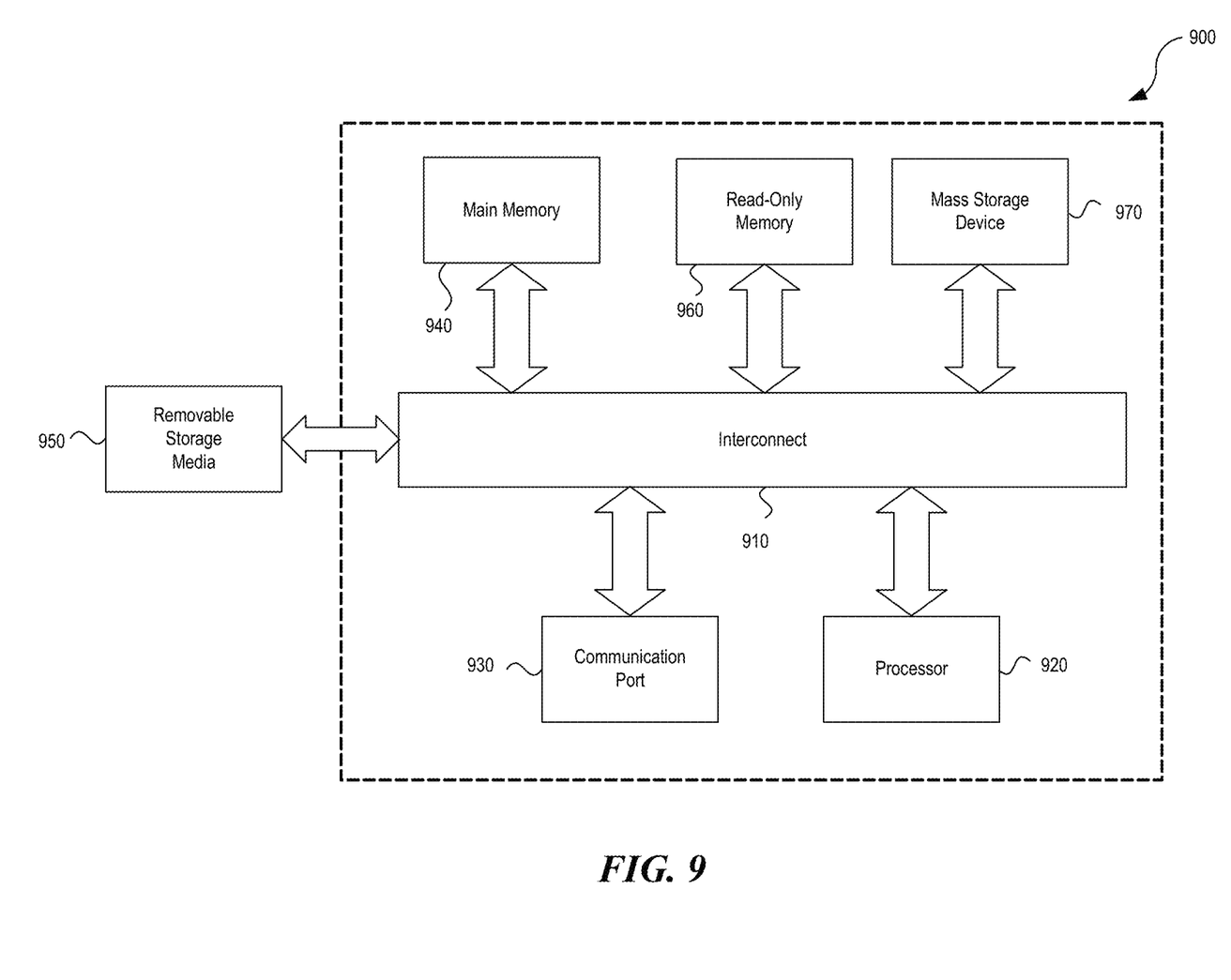
FIG. 9 illustrates an example of a computer system with which some embodiments of the present disclosure may be used.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 9 is an example of a computer system 900 with which embodiments of the present disclosure may be utilized. According to the present example, the computer system includes an interconnect 910, at least one processor 920, at least one communication port 930, a main memory 940, a removable storage media 950, a read-only memory 960, and a mass storage device 970.

Processor(s) 920 can be any known processor, such as, but not limited to, Intel® Itanium® or Itanium 2® processor(s), or AMD® Opteron® or Athlon MP® processor(s), or Motorola® lines of processors. Communication port(s) 930 can be any of an RS-232 port for use with a modem-based dial-up connection, a 10/100 Ethernet port, or a Gigabit port using copper or fiber. Communication port(s) 930 may be chosen depending on a network, such a local area network (LAN), wide area network (WAN), or any network to which the computer system 900 connects.

Main memory 940 can be random-access memory (RAM) or any other dynamic storage device(s) commonly known in the art. Read-only memory 960 can be any static storage device(s), such as programmable read-only memory (PROM) chips for storing static information, such as instructions for processor 920.

Mass storage device 970 can be used to store information and instructions. For example, hard disks such as the Adaptec® family of SCSI drives, an optical disc, an array of disks such as RAID, the Adaptec family of RAID drives, or any other mass storage devices may be used.

Interconnect 910 communicatively couples processor(s) 920 with the other memory, storage, and communication blocks. Interconnect 910 can be a PCI/PCI-X- or SCSI-based system bus, depending on the storage devices used.

Removable storage media 950 can be any kind of external hard drives, floppy drives, IOMEGA® Zip Drives, CD-ROM, compact disc re-writable (CD-RW), or digital video disc read-only memory (DVD-ROM).

The components described above are meant to exemplify some types of possibilities. In no way should the aforementioned examples limit the disclosure, as they are only exemplary embodiments.

TERMINOLOGY

Brief definitions of terms, abbreviations, and phrases used throughout this application and the appendices are given below.

The terms "connected" or "coupled" and related terms are used in an operational sense and are not necessarily limited to a direct physical connection or coupling. Thus, for example, two devices may be coupled directly or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "embodiments," and the like generally mean that the particular feature, structure, or characteristic following the phrase is included in at least one embodiment of the present disclosure and may be included in more than one embodiment of the present disclosure. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a local area network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs) interconnected via gateways operable to facilitate communication between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks, as one skilled in the art will appreciate. As such, the illustrated applications of the embodiments of the present disclosure are not meant to be limiting, but instead are examples. Other systems, devices, and networks to which embodiments of the present disclosure are applicable include, but are not limited to, other types of communication and computer devices and systems. More specifically, embodiments are applicable to communication systems, services, and devices such as cell phone networks and compatible devices. In addition, embodiments are applicable to all levels of computing, from the personal computer to large network mainframes and servers.

In conclusion, the present disclosure discloses novel systems, methods, and arrangements for an adaptive probability matrix. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

What is claimed is:

1. A non-transitory computer-readable medium storing instructions that when executed by a processor of a server, cause the processor to perform the operations of:
   analyzing historical information related to a user depressing a saver button, wherein the historical information includes information associated with one or more funds transfers from a first account to a second account that were initiated based on the user depressing the saver button;
   determining a notification schedule that reminds the user to depress the saver button, wherein determining the notification schedule includes:
      generating an adaptive probability matrix that includes probabilities of incremental times within a day that the user will depress the saver button, wherein generating the adaptive probability matrix is based on the historical information,
      determining a number of times within the day that the saver button needs to be depressed to achieve a savings goal of the user based on an amount of the funds transferred each time the saver button is depressed, and
      creating the notification schedule for notifications to be sent based on A) the probabilities of the incremental times within the day and B) the determined number of times within the day that the saver button needs to be depressed to achieve the savings goal;
   receiving a message from the saver button;
   determining from the message that the saver button is within a proximity to a user device;
   determining an identity of the user associated with the user device; and
   transmitting a notification to the user device, based on the proximity of the saver button to the user device and the identity of the user, in accordance with the notification schedule.

2. The non-transitory computer-readable medium of claim 1, wherein the operations further comprise:
   determining, prior to transmitting the notification schedule, that a total amount of funds in the first account are above a threshold amount.

3. The non-transitory computer-readable medium of claim 1, wherein the historical information includes at least one of:
   times the saver button was depressed,
   days of a week that the saver button was depressed,
   one or more of devices and networks connected to the saver button or the user device when the saver button was depressed, and
   a location of the user device when the saver button was depressed.

4. The non-transitory computer-readable medium of claim 1, wherein the instructions, when executed by the processor, further cause the processor to perform the operations of:
   generating an updated adaptive probability matrix after the day with the historical information that is updated to include information related to the user depressing the saver button during the day.

5. The non-transitory computer-readable medium of claim 1, wherein the historical information further includes location information of the user device when the saver button was depressed, wherein the instructions, when executed by the processor, further cause the processor to perform the operations of:
   determining the location of the user device prior to sending the notification;
   detecting the location of the user device that does not match the location information in the historical information of the user device when the saver button was depressed; and
   altering the notification schedule to send the notification at different incremental times within the day,
   wherein the different incremental times within the day is associated with a lower probability that is above a threshold.

6. The non-transitory computer-readable medium of claim 1, wherein the instructions, when executed by the processor, further cause the processor to perform the operations of:
   checking the number of times the saver button has been depressed prior to sending the notification; and
   altering the notification schedule when the user has met the savings goal.

7. The non-transitory computer-readable medium of claim 1, wherein the instructions, when executed by the processor, further cause the processor to perform the operations of:
   determining the user device as not in communication with the saver button; and
   altering the notification schedule to a later time.

8. A computer-implemented method comprising:
   analyzing, by a processor of a server, historical information related to a user depressing a saver button, wherein the historical information includes information associated with one or more funds transfers from a first account to a second account that were initiated based on the user depressing the saver button;
   determining, by the processor, a notification schedule that reminds the user to depress the saver button, wherein determining the notification schedule includes:
      generating, by the processor, an adaptive probability matrix that includes probabilities of incremental times within a day, that the user will depress the saver button, wherein generating the adaptive probability matrix is based on the historical information,
      determining, by the processor, a number of times within the day that the saver button needs to be depressed to achieve a savings goal of the user based on an amount of the funds transferred each time the saver button is depressed, and
      creating, by the processor, the notification schedule for notifications to be sent based on A) the probabilities of the incremental times within the day and B) the determined number of times within the day that the saver button needs to be depressed to achieve the savings goal;
   receiving, by the processor, a message from the saver button;
   determining, by the processor, from the message that the saver button is within a proximity to a user device;
   determining, by the processor, an identity of the user associated with the user device; and
   transmitting, by the processor, a notification to the user device, based on the proximity of the saver button to the user device and the identity of the user, in accordance with the notification schedule.

9. The computerized method of claim 8, further comprising:
   determining, by the processor, prior to transmitting the notification schedule, that a total amount of funds in the first account are above a threshold amount.

10. The computerized method of claim 8, wherein the historical information includes at least one of:
   times the saver button was depressed,
   days of a week that the saver button was depressed,
   one or more of devices and networks connected to the saver button or the user device when the saver button was depressed, and
   a location of the user device when the saver button was depressed.

11. The computerized method of claim 8, further comprising:
   generating, by the processor, an updated adaptive probability matrix after the day with the historical information that is updated to include information related to the user depressing the saver button during the day.

12. The computerized method of claim 8, wherein the historical information further includes location information of the user device when the saver button was depressed, wherein the method further comprises:
   determining, by the processor, the location of the user device prior to sending the notification;
   detecting, by the processor, the location of the user device that does not match the location information in the historical information of the user device when the saver button was depressed; and
   altering, by the processor, the notification schedule to send the notification at different incremental times within the day,
   wherein the different incremental times within the day is associated with a lower probability that is above a threshold.

13. The computerized method of claim 8, further comprising:
   checking, by the processor, the number of times the saver button has been depressed prior to sending the notification; and
   altering, by the processor, the notification schedule when the user has met the savings goal.

14. The computerized method of claim 8, further comprising:
   determining, by the processor, the user device as not in communication with the saver button; and
   altering, by the processor, the notification schedule to a later time.

15. A system comprising:
   one or more processors;
   a non-transitory computer-readable storage storing executable instructions that when executed by the one or more processors causes the one or more processors to perform the steps of:
   analyzing historical information related to a user depressing a saver button, wherein the historical information includes information associated with one or more funds transfers from a first account to a second account that were initiated based on the user depressing the saver button;
   determining a notification schedule that reminds the user to depress the saver button, wherein determining the notification schedule includes:
      generating an adaptive probability matrix that includes probabilities of incremental times within a day, that the user will depress the saver button, wherein generating the adaptive probability matrix is based in part on the historical information,
      determining a number of times within the day that the saver button needs to be depressed to achieve a savings goal of the user based on an amount of the funds transferred each time the saver button is depressed, and
      creating the notification schedule for notifications to be sent based on A) the probabilities of the incremental times within the day and B) the determined number of times within the day that the saver button needs to be depressed to achieve the savings goal;
   receiving a message from the saver button;
   determining from the message that the saver button is within a proximity to a user device;
   determining an identity of the user associated with the user device; and
   transmitting a notification to the user device, based on the proximity of the saver button to the user device and the identity of the user, in accordance with the notification schedule.

16. The system of claim 15, wherein the historical information includes one or more devices and networks connected to the saver button or the user device when the saver button was depressed and a location of the user device when the saver button was depressed.

17. The system of claim 15, wherein the historical information further includes location information of the user device when the saver button was depressed, wherein the non-transitory computer-readable storage medium stores additional instructions that when executed by the one or more processors causes the one or more processors to perform the steps of:
   determining the location of the user device prior to sending the notification,
   detecting the location of the user device that does not match the location information in the historical information of the user device when the saver button was depressed;
   altering the notification schedule to send the notification at different incremental times within the day,
   wherein the different one or more times within the day and/or one or more days within the week is associated with a lower probability that is above a threshold.

18. The system of claim 15, wherein the non-transitory computer-readable storage medium stores additional instructions that when executed by the one or more processors causes the one or more processors to perform the steps of:
   checking the number of times the saver button has been depressed prior to sending the notification; and
   altering the notification schedule when the user has met the savings goal.

19. The system of claim 15, wherein the non-transitory computer-readable storage medium stores additional instructions that when executed by the one or more processors causes the one or more processors to perform the steps of:
   determining the user device as not in communication with the saver button; and
   altering the notification schedule to a later time.

20. The computerized method of claim 8, wherein the notification includes projected savings based on depressing the saver button according to the notification schedule.

* * * * *